US009264606B2

(12) United States Patent
Ishihara

(10) Patent No.: US 9,264,606 B2
(45) Date of Patent: Feb. 16, 2016

(54) PROCESSING DEVICE, IMAGE PICKUP DEVICE AND PROCESSING METHOD

(71) Applicant: CANON KABUSHIKI KAISHA, Tokyo (JP)

(72) Inventor: Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/500,789

(22) Filed: Sep. 29, 2014

(65) Prior Publication Data

US 2015/0092091 A1 Apr. 2, 2015

(30) Foreign Application Priority Data

Oct. 2, 2013 (JP) .................................. 2013-207017

(51) Int. Cl.

| | |
|---|---|
| *H04N 5/365* | (2011.01) |
| *H04N 5/232* | (2006.01) |
| *H04N 9/64* | (2006.01) |
| *H04N 5/208* | (2006.01) |
| *G02B 7/10* | (2006.01) |

(52) U.S. Cl.
CPC ............ *H04N 5/23212* (2013.01); *G02B 7/102* (2013.01); *H04N 5/208* (2013.01); *H04N 5/3656* (2013.01); *H04N 9/646* (2013.01)

(58) Field of Classification Search
CPC . H04N 5/3656; H04N 5/23212; H04N 5/208; H04N 9/646; H04N 21/4318; G02B 7/102; G02B 27/646
USPC ............. 348/208.12, 242, 289, 346, 354, 355
See application file for complete search history.

(56) References Cited

U.S. PATENT DOCUMENTS

| | | | | |
|---|---|---|---|---|
| 2002/0154792 A1* | 10/2002 | Cornog | ................. | G06T 7/2033 382/107 |
| 2010/0157127 A1* | 6/2010 | Takayanagi | ........ | H04N 5/23293 348/333.02 |
| 2011/0128422 A1* | 6/2011 | Nagata | ................... | H04N 9/045 348/241 |
| 2013/0177260 A1* | 7/2013 | Fujii | .................... | H04N 1/4092 382/309 |
| 2014/0003734 A1* | 1/2014 | Umansky | ................ | G06T 5/003 382/275 |

FOREIGN PATENT DOCUMENTS

| | | |
|---|---|---|
| JP | H01-167610 A | 7/1989 |
| JP | 2001-208524 A | 8/2001 |
| JP | 2010-016743 A | 1/2010 |
| JP | 2012-003233 A | 1/2012 |
| JP | 2013-030895 A | 2/2013 |

* cited by examiner

*Primary Examiner* — Hung Lam
(74) *Attorney, Agent, or Firm* — Canon USA Inc., IP Division

(57) ABSTRACT

A processing device which obtains distance information of a subject, including: a calculation unit configured to calculate the distance information of the subject from a difference in blur degree of a plurality of images photographed by an imaging optical system; a correcting unit configured to correct the distance information using correction data in accordance with an image height in the imaging optical system; and an extraction unit configured to extract at least one frequency component from each of the plurality of images, wherein the calculation unit calculates the distance information from a difference in blur degree in the plurality of images in the at least one frequency component; and the correcting unit corrects the distance information using correction data in accordance with an image height in the at least one frequency component.

17 Claims, 12 Drawing Sheets

PROCESSING DEVICE, IMAGE PICKUP DEVICE AND PROCESSING METHOD

BACKGROUND OF THE INVENTION

1. Field of the Invention

The present invention relates to a processing device which obtains distance information of a subject from a photographed image, and an image pickup device provided with the processing device. The present invention also relates to a processing method for obtaining distance information of a subject from a photographed image.

2. Description of the Related Art

As a method for obtaining, from a two-dimensional image obtained by an image pickup device, a distance of a subject in the image in a depth direction, a depth from defocus (DFD) system as disclosed in Japanese Patent Laid-Open No. 01-167610 has been proposed. In the DFD system, a plurality of images having different blur degrees are obtained by controlling photographing conditions (which is also referred to as photographing parameters) of an imaging optical system. Then a blur size and a blur correlation quantity among the plurality of images are calculated using distance measuring pixels and peripheral pixels thereof. Since the blur size and the blur correlation quantity change depending on a distance from an in-focus position of an imaging optical system to a subject, the distance from the in-focus position of the imaging optical system to the subject is obtained by using the correlation quantity.

Japanese Patent Laid-Open No. 2010-016743 discloses a distance measuring apparatus which calculates a subject distance from a blur correlation quantity calculated for each area to be processed using the DFD system. In the apparatus, a weighting factor is set to the blur correlation quantity of every pixel unit for each pixel in the area to be processed and the blur correlation quantity is weight averaged in accordance with the weighting factor.

In an imaging optical system of a typical image pickup device, there are aberration, such as a curvature of field, spherical aberration, coma aberration and axial chromatic aberration, and thus focus positions differ depending on image height. In such a distance measuring method as the DFD system in which a difference in blur is used, since the distance information based on the focus position of the imaging optical system is obtained, an error in accordance with the image height is caused also in the distance information if the focus positions differ depending on the image height.

In Japanese Patent Laid-Open No. 01-167610 and Japanese Patent Laid-Open No. 2010-016743, it is not mentioned that an error in distance information is caused due to offset of focus positions in accordance with image height of the imaging optical system.

SUMMARY OF THE INVENTION

An object of the present invention is to obtain distance information of a subject accurately in consideration that focus positions differ depending on image heights.

A processing device which obtains distance information of a subject, including: a calculation unit configured to calculate the distance information of the subject from a difference in blur degree of a plurality of images photographed by an imaging optical system; a correcting unit configured to correct the distance information using correction data in accordance with an image height in the imaging optical system; and an extraction unit configured to extract at least one frequency component from each of the plurality of images, wherein the calculation unit calculates the distance information from a difference in blur degree in the plurality of images in the at least one frequency component; and the correcting unit corrects the distance information using correction data in accordance with an image height in the at least one frequency component.

Further features of the present invention will become apparent from the following description of exemplary embodiments with reference to the attached drawings.

DESCRIPTION OF THE EMBODIMENTS

The present invention proposes an improvement in an image processing device which calculates distance information from a photographed image. More particularly, the present invention relates to a technique to calculate, by using two or more images photographed under different photographing conditions, distance information of a subject in a depth direction in accordance with a difference in blur degrees of those images (i.e., the DFD system) and to propose an improvement in that technique. This specification proposes a technique to calculate distance information of a subject by the DFD system accurately even in a case in which aberration in an imaging optical system of an image pickup device or other problems occur. That technique may be implemented as a function of an image processing device (i.e., an image processing engine) which is to be mounted in an image pickup device, such as a digital camera, a digital camcorder and a monitoring camera. The technique is used in various types of image processing executed to a photographed image (e.g., distance measurement, distance map creation, subject segmentation, background blurring, blur effect imparting, a skin glamorizing process and a super-resolution process).

The distance information in the present invention may be a relative distance from an intermediate position of focus positions of two images to a subject or a relative distance from a focus position of either one image to a subject, or an absolute distance from an image pickup device at the time of photographing to a subject. The absolute distance or the relative distance may be either a distance on an image surface side or a distance on an object side. The distance may be expressed either by a real space distance or by a defocused amount.

The present invention will be described in detail with reference to the embodiments and the drawings, but the present invention is not limited to the configuration of each embodiment. Configurations constituted by combinations of the embodiments are also included in the present invention.

First Embodiment

Figure 1:
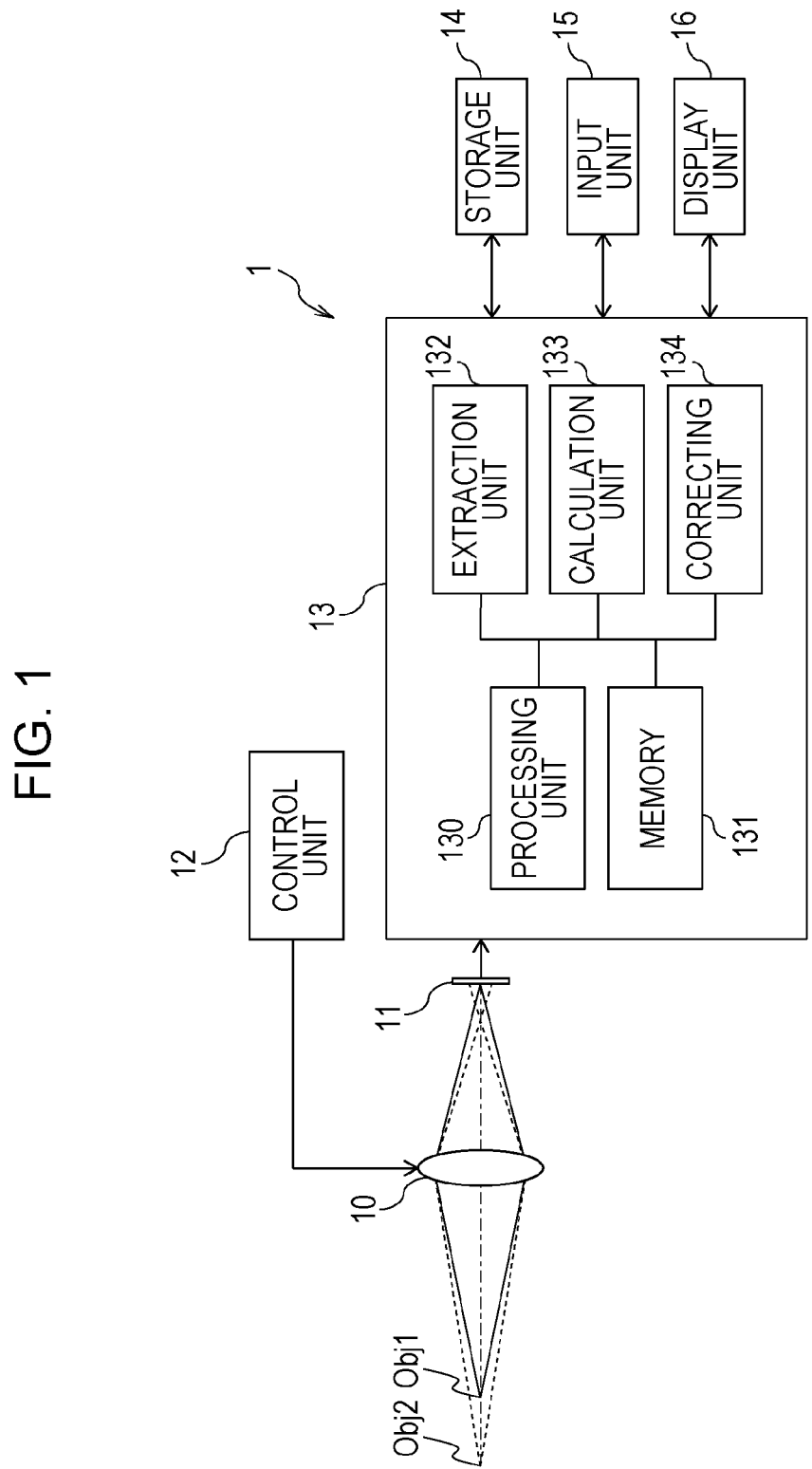
FIG. 1 is a schematic diagram of an exemplary image pickup device provided with an image processing device according to a first embodiment.

FIG. 1 schematically illustrates a configuration of an image pickup device 1 provided with an image processing device 13 according to the present embodiment. The image pickup device 1 includes an imaging optical system 10, an image pickup element 11, a control unit 12 of the imaging optical system, an image processing device 13, a storage unit 14, an input unit 15 and a display unit 16.

The image processing device 13 includes a processing unit 130, a memory 131, an extraction unit 132, a calculation unit 133 and a correcting unit 134. The processing unit 130 is a function to execute various signal processes, such as A/D conversion of analog signals output from the image pickup element 11, noise elimination, demosaicing, luminance signal and color-difference signal conversion, aberration correction, white balance correction, color correction and gamma correction.

Digital image signals output from the processing unit 130 are stored in the memory 131 and are provided for, for example, recording (i.e., saving) in the storage unit 14 or calculation of distance information. The extraction unit 132 has a function to extract predetermined frequency components from two photographed images having different blur degrees in photographed images that have been subject to predetermined signal processing in the processing unit 130. The calculation unit 133 has a function to calculate distance information of a subject from a difference in blur degree in each frequency component extracted from each of the two photographed images. The correcting unit 134 has a function to correct the distance information calculated by the calculation unit 133 based on focus information of the imaging optical system 10.

Principle of Calculation of Distance Information

Calculation of distance using focus bracketing will be described with reference to FIG. 1. First, a focus of the imaging optical system 10 is set at a first focus position Obj1 by the control unit 12 and a subject is photographed through an optical path illustrated by a solid line. Then the focus of the imaging optical system 10 is changed to a second focus position Obj2 by the control unit 12 and the same subject is photographed through an optical path illustrated by a dashed line. In this manner, two images having different blur degrees are obtained by the image pickup element 11. This photographing method in which focus positions are changed in the photographing conditions is referred to as focus bracketing. Another photographing method in which the photographing conditions are changed to obtain different blur degrees in two images is aperture bracketing in which an aperture diameter of a diaphragm is changed when photographing two images. The present invention is applicable to any other photographing methods of a plurality of images having different blur degrees.

Although an image pickup element having a single image sensor has been illustrated as an example in FIG. 1, the present invention is not limited to the same: three image pickup elements having image sensors for each color ("3-CCD" or "3-CMOS") may be used.

In the distance information calculation of the present invention, the distance information is estimated using correlation in small areas of the two images in which the same subject is located. The small areas of the same location are used in a case in which there is neither hand shake nor a movement of a subject during a period in which two images are photographed while small areas in which the same subject is located searched by an alignment process is used in a case in which there is hand shake or a movement of a subject. Hereinafter, description will be made assuming that there is neither hand shake nor a movement of a subject: if there is a hand shake or a movement of a subject, however, the same description is applicable by using small areas in which the same subject is located.

Although the subject is captured with high sharpness when it is located at a focus position of the imaging optical system 10, the sharpness decreases as the subject is separated from the focus position of the imaging optical system 10. The sharpness is lost when the subject is separated from the focus position to some extent.

In the present embodiment, the extraction unit 132 extracts frequency components of a specific frequency band from two photographed images. Then the calculation unit 133 detects a difference in blur degree in the same frequency component in the extracted two photographed images and obtains distance information of the subject. In particular, the calculation unit 133 calculates a correlation quantity in the same frequency component in the extracted two photographed images and calculates distance information of the subject from the correlation quantity. A correlation quantity NCC is calculated by Expression 1.

$$NCC = \frac{\sum (I1_i - I1_{av})(I2_i - I2_{av})}{\sqrt{\sum (I1_i - I1_{av})^2} \sqrt{\sum (I2_i - I2_{av})^2}} \quad 1$$

In Expression 1, $I1_i$ denotes a signal value of a specific frequency component in the small area of one of the two photographed images and $I1_{av}$ denotes an average value of the signal values of the same specific frequency component in the small area. $I2_i$ denotes a signal value of the same specific frequency component in the small area of the other of the two photographed images and $I2_{av}$ denotes an average value of the signal values of the same specific frequency component in the small area.

It is at the intermediate point of the focus positions of the two images that the correlation quantity becomes the largest in the DFD system of a focus bracketing system, and the correlation quantity becomes smaller as it separates from the intermediate point. By using this phenomenon, it is possible to determine a relative position of the subject from the intermediate point of the focus positions of the two images. It is also possible to determine whether the subject is located on the front side (i.e., a direction approaching the image pickup device 1) or on the rear side (i.e., a direction separating from the image pickup device 1) with respect to the intermediate point of the focus positions of the two images. In particular, if Expression 2 is satisfied, the subject is located further toward the focus position of an image 1 than the intermediate point of the focus positions of the two images and, if Expression 3 is satisfied, the subject is located further toward the focus position of an image 2 than the intermediate point of the focus positions of the two images.

$$\Sigma(I1_i - I1_{av})^2 > \Sigma(I2_i - I2_{av})^2 \qquad 2$$

$$\Sigma(I1_i - I1_{av})^2 < \Sigma(I2_i - I2_{av})^2 \qquad 3$$

In this manner, the position of the subject may be determined with respect to the front and rear of the intermediate point of the focus positions in the two images. By making the front and rear determination result be reflected in the distance information calculated by the DFD system, distance information consistent from the front to the rear may be computed. Regarding reflection of the front and rear determination, the distance information DSR after reflection of the front and rear determination may be obtained by converting, by Expression 4, distance information DS in a pixel determined as the front side. The defocus position and the DSR values of 0 to 2 may be made to correspond one to one by conveniently converting the distance information DS into the distance information DSR as expressed by Expressions 4 and 5.

When the front and rear determination result is "front":

$$DSR = 2 - DS \qquad 4$$

When the front and rear determination result is "rear":

$$DSR = DS \qquad 5$$

In converting the distance information into an actual distance, it is only necessary to calculate a relationship between the defocus position and a change in the correlation quantity in the frequency component in advance and to store the calculation result, and to obtain the defocus position by reverse calculating from the calculated correlation quantity.

The frequency component may be extracted in two kinds of methods. One of these methods is to extract only a frequency component of a specific frequency band by convolution of a band pass filter that is designed for a real space into a photographed image. This method is advantageous in a lower operation cost because image processing may be executed only in a real space. Another of these methods is to execute the Fourier transformation of a photographed image to convert the photographed image into an image of a frequency space, then to extract only a frequency component of a specific frequency band and to execute the inverse Fourier transformation to reproduce the image to a real space image. This method is advantageous in that only a specific frequency band may be extracted.

Although the distance information here is a relative distance from the intermediate point of the focus positions of the two images, a distance from the image pickup device 1 to the subject may also be obtained. In that case, it is necessary to first obtain a distance $S_{obj}$ from the image pickup device 1 to a focus position of the imaging optical system 10 using Expression 6.

$$\frac{1}{S_{obj}} = \frac{1}{S_{img}} - \frac{1}{f} \qquad 6$$

Here, $S_{img}$ denotes a distance from the imaging optical system 10 to an image surface and f denotes a focal length of the imaging optical system 10.

By Expression 6, a distance $S_{obj1}$ from the image pickup device 1 to the focus position Obj1 when a first image is photographed and a distance $S_{obj2}$ from the image pickup device 1 to the focus position Obj2 when a second image is photographed may be obtained. By Expression 7, a distance $S_{objm}$ from the image pickup device 1 to the intermediate point of the focus bracketing may be obtained.

$$S_{objm} = \frac{S_{obj1} + S_{obj2}}{2} \qquad 7$$

In a case in which the blur degrees differ from each other in the two photographed images by an aperture bracketing system, the distance information of the subject that is to be obtained is a relative distance from the focus position of the imaging optical system 10. Similarly, the distance from the image pickup device to the subject may also be obtained.

In the present invention, the distance information is at least calculated and the actual distance is calculated if necessary. Necessity for the actual distance depends on the applications, but such applications as subject segmentation, background blurring and blurring effect imparting may be implemented only with distance information.

Correction of Distance Information

Figure 2A:
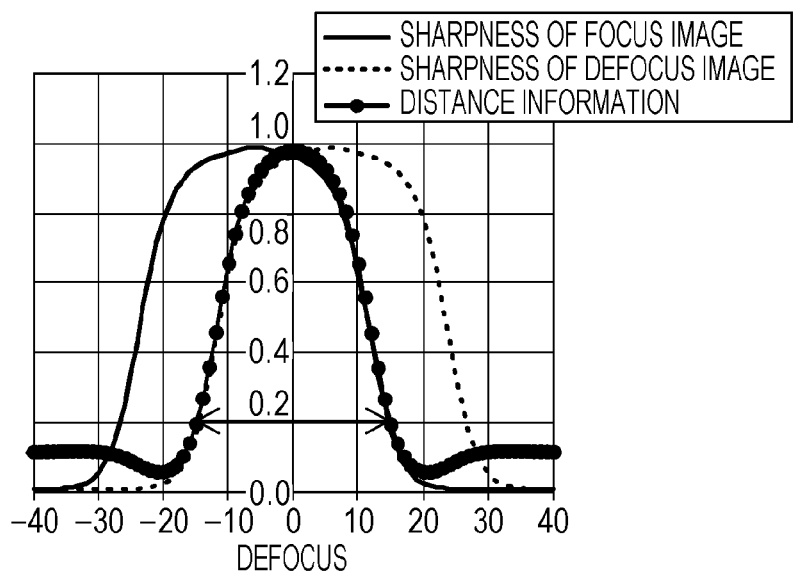
FIGS. 2A to 2C are diagrams describing sharpness of an image and distance information.
Figure 2B:
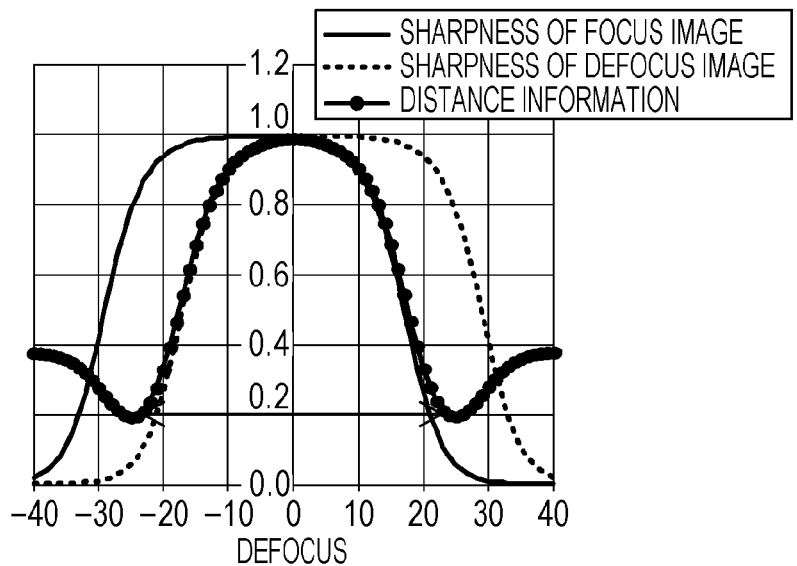
Figure 2C:
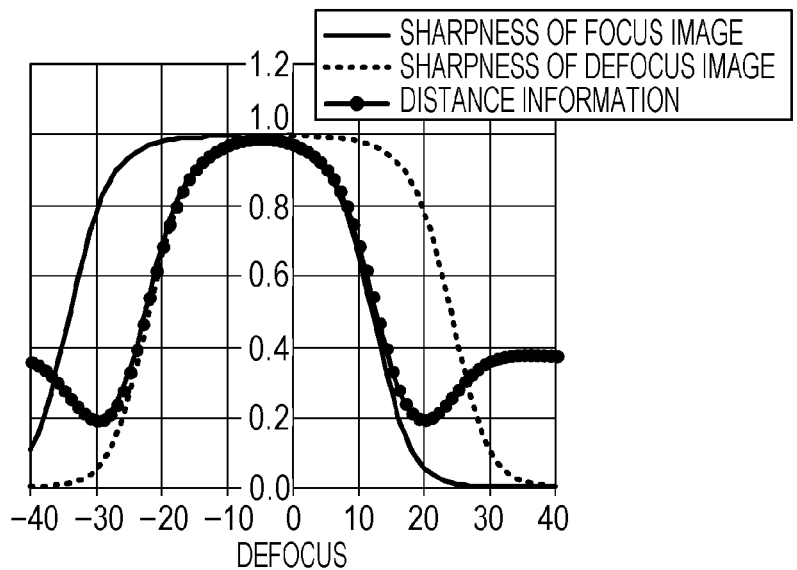

FIGS. 2A to 2C illustrate sharpness of a focus image obtained by focus bracketing, sharpness of defocus image obtained by focus bracketing, and distance information obtained from these two images. In each graph of FIGS. 2A to 2C, a vertical axis represents a score of sharpness or distance information, and a horizontal axis represents a defocus position from the center of focus bracketing. FIG. 2A illustrates sharpness and distance information of two images on an optical axis of an image pickup element. FIG. 2B illustrates sharpness and distance information of two images at a position in a peripheral portion separated from the optical axis of the image pickup element, i.e., at a position at which the image height is not 0. FIG. 2C illustrates sharpness and distance information of two images at a position in a peripheral portion separated from the optical axis of the image pickup element in a case in which a curvature of field occurs.

In FIG. 2A, a solid line illustrates sharpness of the focus image: the sharpness of the image decreases as it is separated from the focus position at the time of photographing of the focus image (the defocus position in the graph: position −6). A dashed line illustrates sharpness of the defocus image: the sharpness of the image decreases as it is separated from the focus position at the time of photographing of the defocus image (the defocus position in the graph: position +6). Here, an amount of focus bracketing which is a distance between the focus position of the focus image and the focus position of the defocus image is 12.

In the graph of FIG. 2A, a solid line with round markers illustrates distance information. This means that correlation values are calculated by extracting specific frequency components from the focus image and the defocus image. The score of the distance information becomes the maximum value when the defocus position is 0. In the example of FIG. 2A, a period is the distance information in the frequency component corresponding to 2.0 to 2.2 pixels, and the score of the distance information is 0.979 when the defocus position is 0. The score of the distance information decreases as the defocus position is separated from 0 and the score of the distance information becomes the minimum value of 0.148 around the defocus position of ±20. The defocus position at which the score becomes the minimum value is substantially the same position as the position at which sharpness of one of the focus image and the defocus image decreases to the minimum value. The decrease in sharpness of the image determines a distance measurement range. As described above, the distance information obtained from the two images having different blur degrees represents a strong association with the sharpness of each image.

In an imaging optical system, a light flux reaching image height at a peripheral portion generally has a narrower light flux width and a longer focus depth than those of the image height on the optical axis because the former has a smaller apparent aperture diameter of a diaphragm. Further, in a wide view angle imaging optical system having an angle of view exceeding ±30°, the light flux reaching image height at a peripheral portion has vignetting with which the light flux width tends to be further narrowed and a depth width tends to further increase.

FIG. 2B illustrates a relationship between the sharpness of the image and the distance information in the image height of the peripheral portion. The depth width of the distance information in the image height of the peripheral portion will be described with reference to FIG. 2B.

A solid line in the graph of FIG. 2B illustrates the sharpness of the image in the image height of the peripheral portion of the focus image and a dashed line illustrates sharpness of the image in the image height of the peripheral portion of the defocus image. As compared with the graph illustrated in FIG. 2A, a defocusing range until the sharpness decreases from the focus position is larger in the graph of FIG. 2B. That is, the focus depth is longer. In the graph of FIG. 2B, a solid line with round markers illustrates distance information in the image height of the peripheral portion. This distance information is, under an influence of the sharpness of the image, in a state in which the defocusing range has been increased until the score of the distance information decreases and the focus depth has become longer. Thus, in the image height of the peripheral portion, since the width of the reaching light flux becomes narrower, the depth of the distance information becomes longer.

For example, when the absolute value of a difference of two defocused amounts where "distance score=0.2" is referred to as "a depth width of distance information," the depth width of the distance information on the optical axis is 29.9 (which is the width illustrated by an arrow in FIG. 2A) as shown in FIG. 2A. As shown in FIG. 2B, the depth width of the distance information of the peripheral portion is 48.1 (which is the width illustrated by an arrow in FIG. 2B), which is about 1.6 times as large as the depth width of the distance information on the optical axis. As described above, if a difference in depth width of the distance information is caused depending on the image height, it is not possible to calculate a subject located at the same distance from the image pickup element or from the image pickup device as the same distance score, whereby a measurement error of the distance information is caused.

Moreover, an influence in a case in which a curvature of field of the imaging optical system in the image height of the peripheral portion occurs will be described.

A solid line in the graph of FIG. 2C illustrates the sharpness of the image in the image height of the peripheral portion of the focus image and a dashed line illustrates sharpness of the image in the image height of the peripheral portion of the defocus image. The reference of the defocus position of FIG. 2C is of a case in which there is no curvature of field and is the same position as in FIG. 2A. The focus position in the image height of the peripheral portion (i.e., the peak of sharpness of the image) is located at the defocus position "−11" at the time of focus image photographing, and is located at the defocus position "+1" at the time of defocus image photographing. That is, the defocus position is offset by "−5" in both of the two images with respect to the graph of FIG. 2A. This is because a curvature of field by "−5" of the defocused amount has occurred in the imaging optical system. Therefore, regarding the distance information calculated from these correlation values, the defocus position is offset by "−5" similarly. In addition, factors by which the focus position is changed depending on the image height include a difference in an amount of occurrence of spherical aberration and a difference in an amount of occurrence of coma aberration.

In the graph of FIG. 2C, a solid line with round markers illustrates distance information in the image height of the peripheral portion in a case in which there is a curvature of field. In such distance information, the same distance score does not necessarily correspond to the same defocus position and a difference in the depth width of the distance information and origin deviation of the defocus position cause serious errors in measurement accuracy.

Then, in the present embodiment, a difference in depth width of the distance information and an error in the distance information caused by the origin deviation of the defocus position in accordance with the image height of the imaging optical system are corrected, whereby distance information accurately is obtained. That is, in a distance measuring system which obtains distance information of a subject from a difference in blur degrees, the present invention is capable of obtaining distance information accurately even in an image photographed in an imaging optical system of a wide view angle, an imaging optical system which has vignetting, and an image pickup system having a curvature of field.

Figure 3:
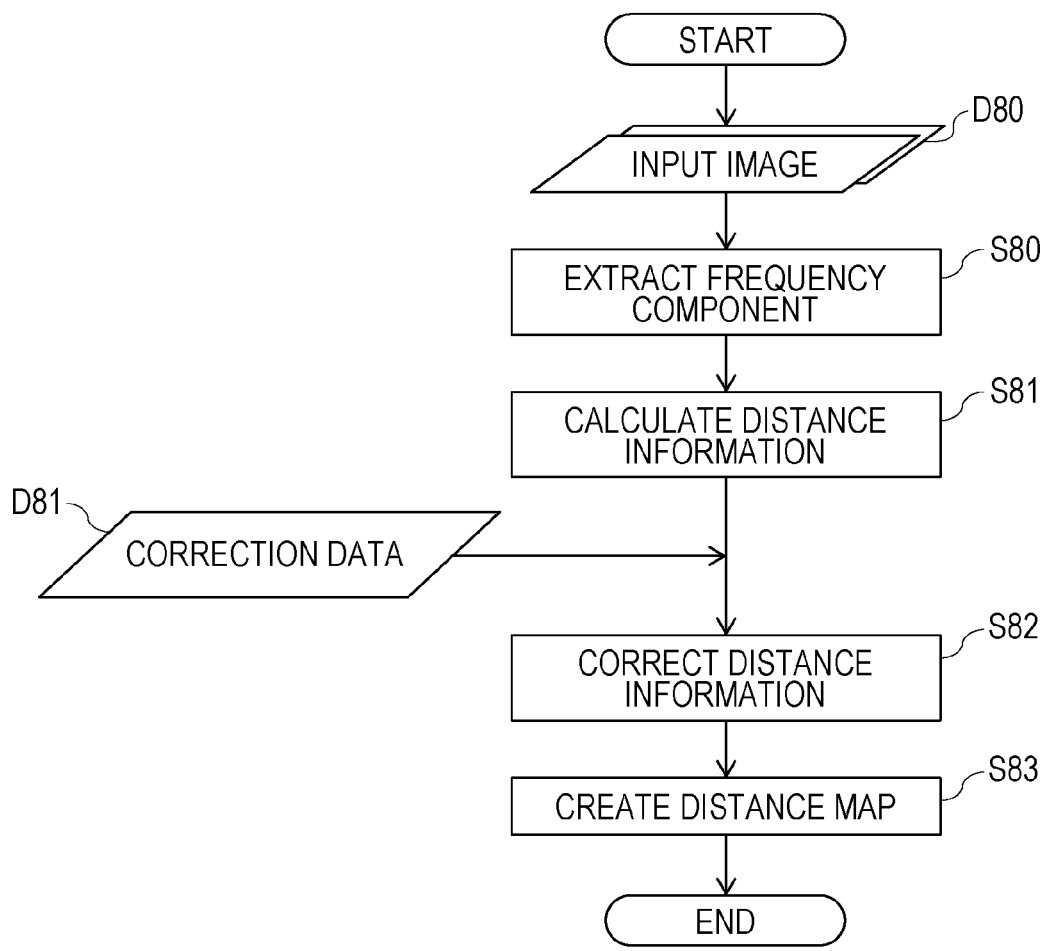
FIG. 3 is a flowchart of an exemplary image processing method according to the first embodiment.

FIG. 3 is a flowchart in the image pickup device of the present embodiment. Operations to calculate the distance information and to create a distance map in the image pickup device of the present embodiment will be described with reference to FIG. 3.

Input images (D80) are a focus image and a defocus image which are two images having different blur degrees photographed in the focus bracketing system by the image pickup device 1.

In an extraction process of a frequency component, the extraction unit 132 extracts a frequency component of a frequency band used for the distance measurement from each of the focus image and the defocus image (S80). The frequency component may be extracted by the Fourier transformation or by filtering using a band pass filter in a real space. In a case in which the Fourier transformation is executed, image information having the frequency component of only a frequency domain used for the distance measurement is extracted by the following manner: after executing the Fourier transformation on the photographed images, the frequency component of only the frequency band used for the distance measurement is extracted, and the inverse Fourier transformation is executed on the extracted frequency component and return the frequency component to the real space image. In a case in which filtering using a band pass filter in a real space is executed, filtering is carried out in the following manner. That is, a band pass filter which can extract a frequency domain used for the distance measurement is created and the band pass filter is convoluted into a real space image, whereby image information with a frequency component of only the frequency domain used for the distance measurement is extracted. In the present embodiment, image information with a frequency component of only the frequency domain used for the distance measurement is obtained using the Fourier transformation.

In a calculating process of the distance information, the calculation unit 133 calculates the distance information by the DFD system from a difference in blur degree between the frequency component of the focus image and the frequency component of the defocus image (S81).

In a correcting process of the distance information, the correcting unit 134 corrects the distance information obtained in S81 using correction data (data D81) and calculates correction distance information (S82). In particular, the correction data (data D81) is a conversion table used in conversion into the defocus position from the distance information in accordance with the image height, and the distance information obtained in S81 is converted into the defocus position in accordance with the conversion table. Here, by setting the converted defocus position as the correction distance information, a difference in the distance score caused by the depth widths of the distance information that are varied depending on the image height is corrected.

In a creating process of a distance map, correction distance information of each pixel is collected and a distance map is created (S83). In addition, shaping of the distance map is executed using, for example, hole filling and degeneration of the number of distance layers, and a distance map useful for the subsequent image processing is provided.

Obtainment of Correction Data

Figure 4A:
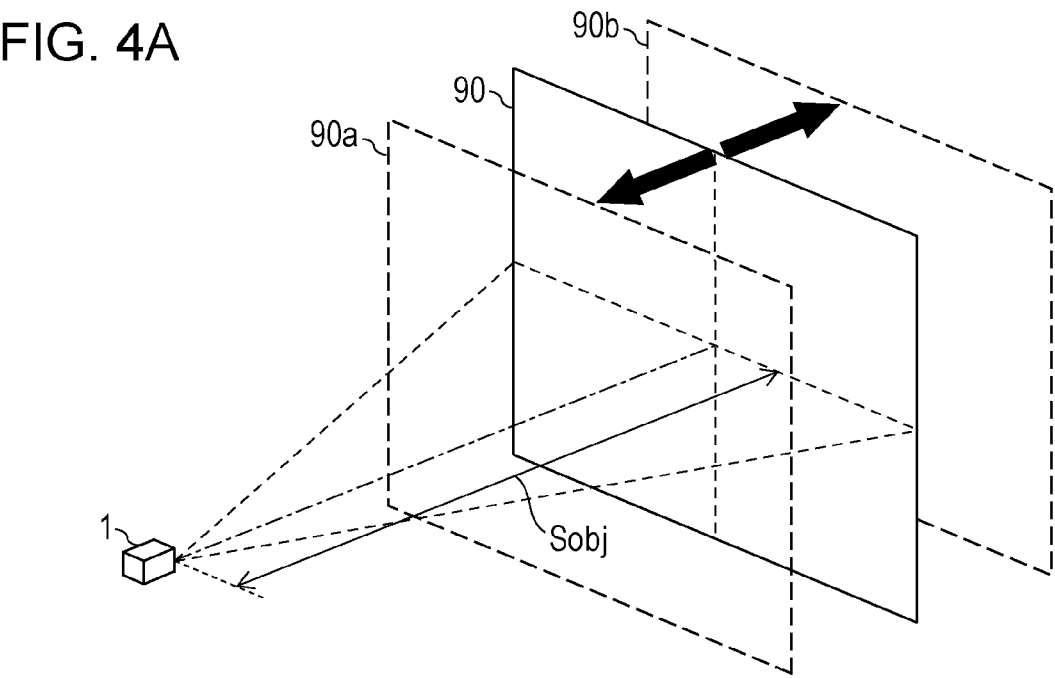
FIG. 4A is a schematic diagram illustrating a correction data obtaining device of distance information according to the first embodiment and FIG. 4B is a flowchart of an exemplary method for obtaining correction data of distance information.
Figure 4B:
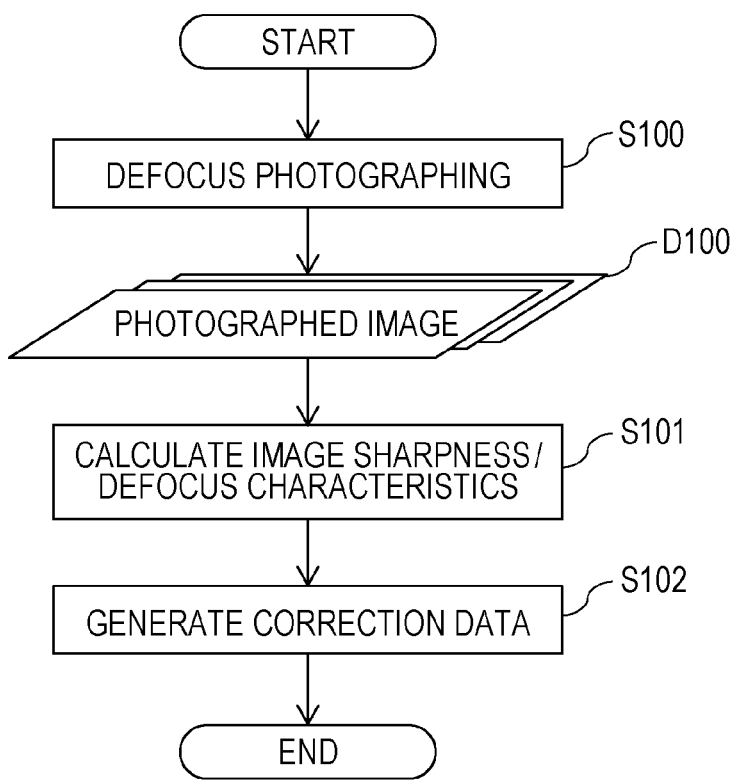

FIG. 4A is a configuration diagram of a device for obtaining correction data used in S82. FIG. 4B is a flowchart for obtaining correction data. An operation about a method for obtaining the correction data in the image pickup device of the present embodiment will be described with reference to FIGS. 4A and 4B.

In FIG. 4A, an evaluation chart 90 is disposed at a position separated by a typical photographing distance from the image pickup device 1. In the present embodiment, the evaluation chart 90 is a plate-shaped random pattern image and is disposed at a position of "object distance Sobj=3 m."

In a defocusing photographing process of FIG. 4B, images are photographed at each defocus position while changing the position of the evaluation chart 90 in a depth direction (90a, 90b) (S100). In particular, the image pickup device 1 photographs images while focusing on the evaluation chart 90. Next, the evaluation chart 90 is moved in the depth direction and an image is photographed again. In this case, the focus position at the time of photographing the images is "object distance Sobj=3 m" which is the same position as described above and thus is not the moved destinations 90a and 90b of the evaluation chart 90. Then an image at each defocus position is photographed by sequentially changing positions of the evaluation chart. In this manner, the photographed images of the evaluation chart 90 corresponding to each defocus position (data D100) are obtained.

In a calculating process of image sharpness defocus characteristics, a focus state of the photographed image at each defocus position is checked (S101). In particular, a high frequency component (which corresponds to 2.0 to 2.2 pixels) is extracted from the photographed image by first filtering using a Laplacian filter g expressed by following Expression 8 with respect to a photographed image f in each defocus position. Then image sharpness I is calculated from "the sum of absolute values of high frequency components" in a small area around a target pixel. The image sharpness I is calculated by Expression 9.

$$g = \begin{bmatrix} 1 & 1 & 1 \\ 1 & -8 & 1 \\ 1 & 1 & 1 \end{bmatrix} \quad 8$$

$$I(x, y) = \sum |f * g| \quad 9$$

The image sharpness defocus characteristics in accordance with the image height may be calculated by correlating the image sharpness I with the defocus position. Here, since the image sharpness I becomes the highest when focused and the amount of the image sharpness I decreases depending on the defocused amount, it is possible to know the focus position (i.e., the amount of the curvature of field) and the depth of the image sharpness in accordance with the image height. As described above, distance information has a relationship that the distance score shows the highest value at the intermediate point of the focus position of the focus image and the focus position of the defocus image and that the distance score shows the lowest value near the point where the image sharpness of either of the focus image or the defocus image decreases to the lowest value. Therefore, the defocusing error and the depth width error in the distance information in accordance with the image height may be known by knowing the image sharpness.

In a creating process of the correction data, in a case of the image height of which focus position is shifted with respect to the image height on the optical axis, correction data in which the original position of the defocus position is to be offset by the amount of the shifted image height is generated (S102). In this manner, an influence of the defocusing error in the distance information may be corrected. Further, regarding the image height of which depth width is shifted with respect to the image height on the optical axis, correction data in which the gradient of the defocus position with respect to the distance information by the amount of the shifted image height is generated (S102). In this manner, an influence of the depth width error in the distance information may be corrected. The correction data (data D81) of the distance information is thus obtained.

Then the correction data (data D81) generated in a manufacturing process is stored in the storage unit 14 of the image pickup device 1 and a state is created in which correction data (data D81) may be extracted from the storage unit 14 as necessary.

As described above, in the image pickup device 1 of the present embodiment, a correlation between the defocus position and the distance information in accordance with the image height is obtained by measuring the image height in accordance with image sharpness defocus characteristics of the imaging optical system. Using this, a conversion table with which the distance information in accordance with the image height may be converted into the defocus position is created and is stored in the storage unit 14. In particular, a correlation between the defocus position and the distance information in each pixel is known in advance and the defocus position of the subject in each pixel is obtained based on the calculated distance information. Next, it becomes possible to obtain the defocus position of the subject accurately by subtracting the amount of the curvature of field of the imaging optical system from the defocus position of the subject of each pixel. When the distance information to be calculated depending on the image height is set to Scr, a defocus position Def may be obtained by Expression 10. At this time, a coefficient of each order term expressed in the polynomial of Expression 10 may be obtained by, for example, executing fitting of a solid line with round markers of FIG. 2C.

$$\text{Def} = M \times (a + b \times \text{Scr}^2 + c \times \text{Scr}^4 + c \times \text{Scr}^6 + \dots) + \text{Ofs} \quad 10$$

In Expression 10, M is a coefficient which varies depending on the front and rear determination result: M=1 when Expression 2 is satisfied and M=−1 when Expression 3 is satisfied. Thus the front and back of the defocus position may be determined. Ofs denotes an offset in the focus position of the imaging optical system and denotes an amount of an offset in the image height for the distance measurement with respect to the image height on the optical axis.

It is only necessary that the process of obtaining the correction data (data D81) is executed before executing the process (S81) of calculating the distance information from the actual photographed image. In the present embodiment, the process of obtaining the correction data (data D81) is executed as a part of the manufacturing process of the image pickup device.

As described above, since the distance information is corrected using the correction data that is prepared in advance after calculating the distance information of the subject, the error in the image height in accordance with the distance score may be corrected and the distance information may be obtained accurately. Even in a case in which asymmetric field curvature occurs due to the curvature of field or the manufacturing error and the assembly error of the lens in an imaging optical system, an influence provided by an offset of the focus position in accordance with the image height on the distance information may be corrected and the distance information in accordance with the image height may be obtained desirably.

In the present embodiment, since the correction data is generated from the defocus characteristics of the sharpness, the distance information may be calculated from a single image without the need of executing a correlation operation in two images. Therefore, calculation time may be shortened and the manufacturing cost may be reduced.

Although an example in which the correction data is generated using the mounted imaging optical system itself and the distance information is corrected based on the correction data is described in the present embodiment, the present invention is not limited to the same. The correction data may be generated using an imaging optical system mounted in a separate image pickup device and the correction data may be stored in the storage unit 14. In that case, for example, if the correction data is generated using an imaging optical system having a lens or a lens barrel of the same lot, the distance information may be corrected accurately because of the similar optical performance. Further, the correction data may be generated based on design information instead of from the measurement result. In this case, it is desirable to use simulation results of the depth width and the focus position of the distance information in accordance with the image height from design values of a lens or a lens barrel.

Although the distance information of the subject is calculated by the DFD system in the present embodiment, the method for calculation is not limited to the same: for example, the depth from focus (DFF) system may also be employed. The DFF system is, as in the DFD system, to calculate distance information of a subject using a difference in blur. In particular, the most focused image in each pixel is searched based on many images photographed while changing the focus position of the imaging optical system many times, and the distance information of the subject is calculated based on the focus position of the image. Also in the DFF system, if a difference in blur occurs due to any factors other than the distance, an unfavorable measurement error is caused in the distance information. Therefore, the distance information may be calculated with high measurement accuracy by using the effect of the present invention.

Second Embodiment

The present embodiment differs from the first embodiment in that correction data is generated based on distance information calculated by a frequency component of a frequency band used for the distance measurement. Hereinafter, differences from the first embodiment will be described mainly.

The configuration of the image pickup device 1 of the present embodiment is the same as that of the first embodiment except that the extraction unit 134 has a function to extract a frequency component of a predetermined frequency band from a photographed image when calculating distance information in the calculation unit 132 or when correcting distance information in the correcting unit 133.

As illustrated in FIGS. 2A to 2C, the depth width of the distance information and the origin deviation of the defocus position depending on the configuration and aberration of the imaging optical system are the causes of a measurement error in the distance information. In this case, the frequency band used at the time of calculating the distance information in the calculation unit 132 is not limited to a high frequency (period: 2.0 pixels) which is detected, for example, with a Laplacian filter, but a frequency band slightly lower than the high frequency may be used. That case is desirable in that the distance information may be calculated accurately without being affected by the noise of the image pickup element. Then, in the present embodiment, the frequency band used for the distance measurement is set to the frequency corresponding to the period of 2.2 to 2.5 pixels. Other frequency bands than those described above may also be used similarly.

Figure 5A:
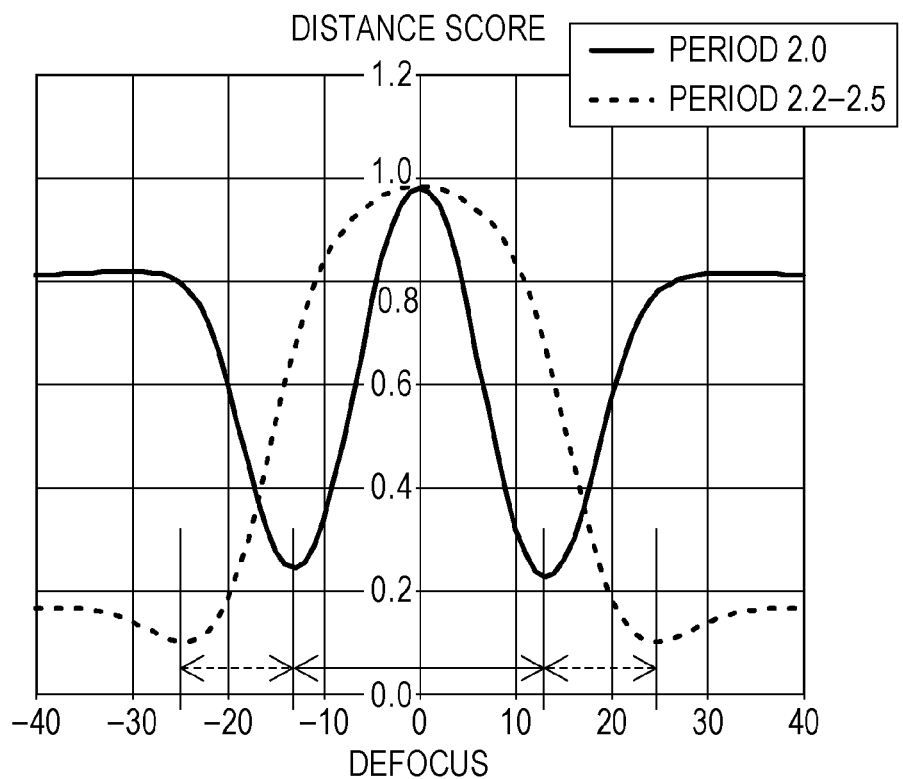
FIGS. 5A and 5B are diagrams describing a relationship between frequency bands and defocus characteristics of distance information.
Figure 5B:
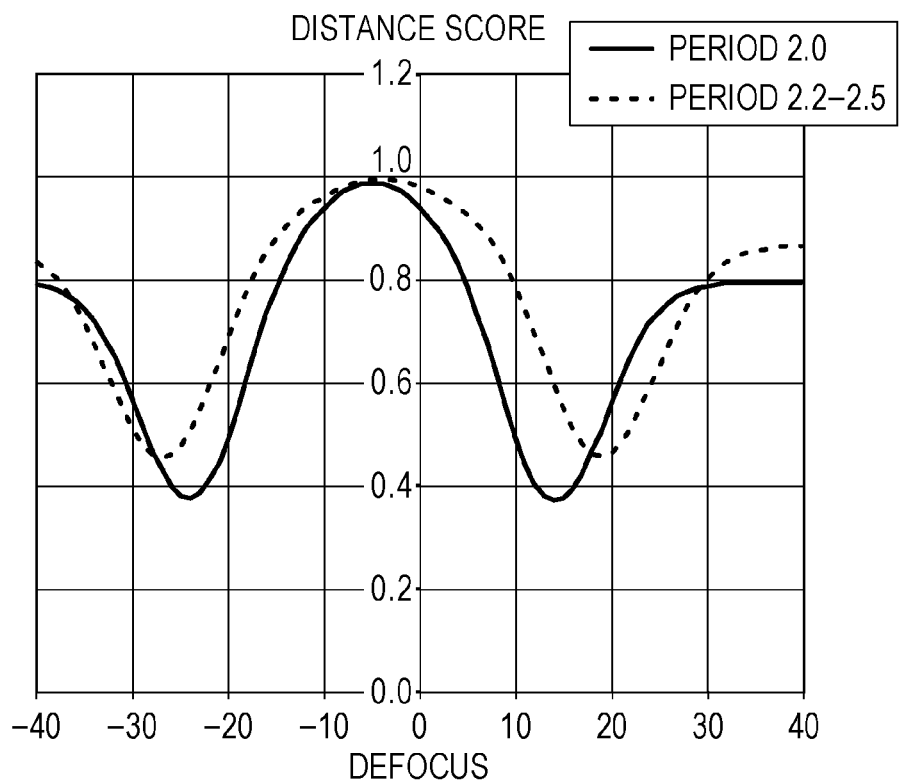

FIG. 5A illustrates defocus characteristics of distance information in an image height on an optical axis. FIG. 5B illustrates defocus characteristics of distance information in an image height of a peripheral portion. A difference in the defocus characteristics of the distance information depending on the frequency band will be described with reference to FIGS. 5A and 5B.

A solid line in the graph of FIG. 5A illustrates the defocus characteristics of the distance information in the image height on the optical axis depending on the frequency component where the period is 2.0 pixels. A dashed line illustrates an average value of the defocus characteristics of the distance information in the image height on the optical axis depending on the frequency component where the period is 2.2 to 2.5 pixels. The distance information depending on the frequency component where the period is 2.0 pixels in the high frequency band has a sudden change in the distance information against a defocusing change. The distance information depending on the frequency component where the period is 2.2 to 2.5 pixels in the slightly lower frequency band has a gradual change in the distance information against a defocusing change. As described above, a difference is caused in the depth width of the distance information depending on the frequency band extracted from the photographed image.

A solid line in the graph of FIG. 5B illustrates the defocus characteristics of the distance information in the image height in a peripheral portion depending on the frequency component where the period is 2.0 pixels. A dashed line illustrates the defocus characteristics of the distance information in the image height on the peripheral portion depending on the frequency component where the period is 2.2 to 2.5 pixels. The distance score is varied depending on the difference in the depth width of the distance information if the frequency band extracted from the photographed image differs also in the image height of the peripheral portion. The original position of the defocus position of the distance information where the distance score becomes the peak may also be varied depending on the frequency band depending on the aberration of the imaging optical system. When these problems occur, even in a case in which the distance information of the subject located at the same defocus position is calculated, the distance scores are varied depending on the frequency band extracted from the photographed image and a measurement error in the distance information is caused.

Figure 6:
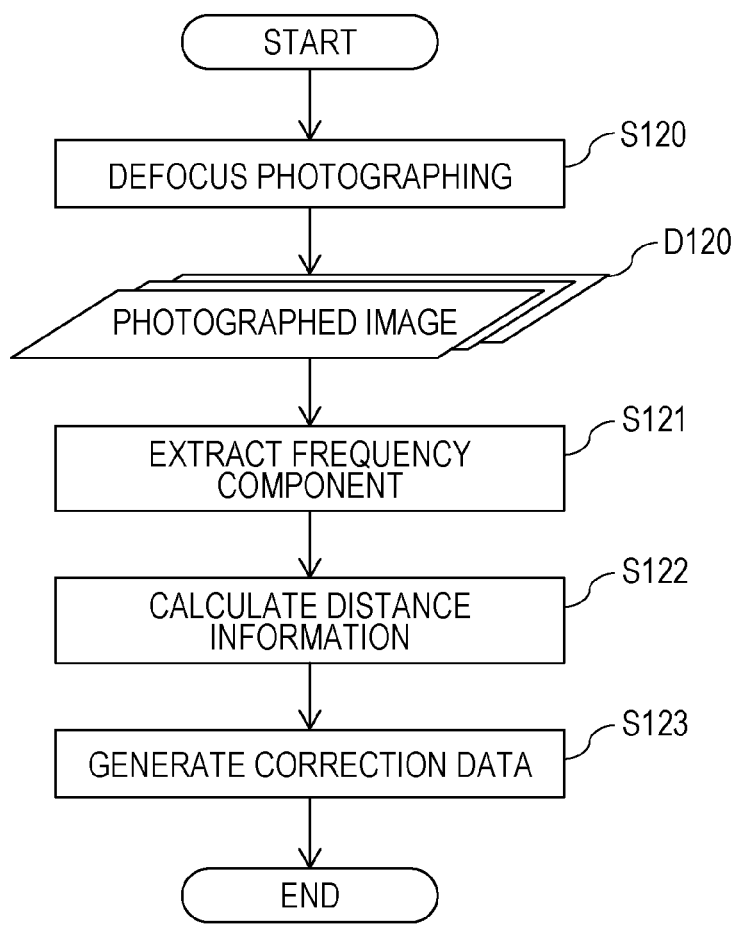
FIG. 6 is a flowchart of an exemplary method for obtaining correction data of distance information according to a second embodiment.

FIG. 6 is a flowchart for obtaining correction data of the present embodiment. Operations to obtain the correction data in the present embodiment will be described with reference to FIG. 4A and FIG. 6.

In the present embodiment, the evaluation chart 90 is a plate-shaped random pattern image and is disposed at a position of "object distance Sobj=3 m."

In the defocusing photographing process (S120) of FIG. 6, two images having different blur degrees are photographed in the focus bracketing system while changing the position of an evaluation chart in the depth direction. In particular, the image pickup device 1 photographs a focus image focusing on the evaluation chart 90, and then photographs a defocus image after shifting the focus position by an amount of focus bracketing (FB) in the depth direction. Then, the evaluation chart 90 is moved in the depth direction (i.e., is moved to the position 90b) and the focus image and the defocus image are photographed again. In this case, the focus position at the time of photographing the focus image is "object distance Sobj=3 m" which is the same position as described above and thus is not the moved destination of the evaluation chart. The focus position at the time of photographing the defocus image is "object distance Sobj=3 m+FB" which is the same as described above. Then the focus image and the defocus image with the evaluation chart being disposed at each defocus position are photographed by sequentially moving the position of the evaluation chart. These are the photographed images (data D120) of the evaluation chart 90 corresponding to each defocus position.

In an extraction process of a frequency component, a frequency component of a frequency band used for the distance measurement is extracted from the photographed image (data D120) of the evaluation chart 90 corresponding to each defocus position (S121). Since the frequency band used for distance measurement in the image pickup device 1 of the present embodiment is a period of 2.2 to 2.5 pixels, a frequency component of a period of 2.2 to 2.5 pixels of the same frequency band is used also when generating the correction data. The frequency component may be extracted by the Fourier transformation or by using a band pass filter. In a case in which the Fourier transformation is executed, image information having the frequency component of only a predetermined frequency band is extracted by the following manner: after executing the Fourier transformation on the photographed images, the frequency component of the predetermined frequency band is extracted, and the inverse Fourier transformation is executed on the extracted frequency component and return the frequency component to the real space image. In a case in which filtering using a real space band pass filter with respect to a photographed image, filtering is carried out in the following manner. That is, a real space band pass filter which can extract a predetermined frequency band is created and the real space band pass filter is convoluted into a real space image, whereby image information with a frequency component of only the predetermined frequency band is extracted. In the present embodiment, image information with a frequency component of only a predetermined frequency band is obtained using the Fourier transformation.

In a calculating process of the distance information, distance information in each defocus position is calculated (S122). In particular, distance information is calculated from a difference in blur degree between a predetermined frequency component of the focus image extracted in S121 and the same predetermined frequency component as that of the focus image of the defocus image. In this case, since the distance information is measured using the frequency component of the same frequency band as that used in the actual distance measurement, the distance information generated due to the performance of the imaging optical system may be known accurately. In particular, since the aperture diaphragm of the image pickup optical system becomes apparently narrower or the width of the light flux reaching the image height of the peripheral portion becomes narrower due to the vignetting, the depth width of the distance information becomes larger than the depth width on the optical axis. Also in this case, the defocus characteristics of the distance information may be calculated from the same depth width as that for the distance measurement. Further, even in a case in which the focus position is changed depending on the image height due to, for example, the curvature of field of the imaging optical system, the distance information with the origin deviation of the defocus position which is the same as that of the distance measurement may be calculated.

In a creating process of the correction data, the correction data (data D81) is generated by the same method as in the first embodiment based on the distance information calculated in S122 (S123).

Then the correction data (data D81) created in a manufacturing process is stored in the storage unit 14 and a state is created in which correction data (data D81) may be extracted from the storage unit 14 as necessary.

As described above, in the present embodiment, in addition to a measurement error in the distance information caused by the reduction of the light flux width by the imaging optical system and an offset of the focus position as described as problems in the first embodiment, a measurement error in the distance information depending on the frequency band extracted from the photographed image may be corrected. Since the distance information is calculated using the same frequency band as that used in the actual distance measurement and the correction data of the distance information is generated, the distance information may be corrected accurately. Therefore, it is possible to always calculate the distance information with high measurement accuracy without depending on the frequency band used for the distance measurement. It is also possible to create an accurate distance map by creating a distance map using the distance information above.

This distance map is used in various types of image processing executed to a photographed image (e.g. distance measurement, distance map creation, subject segmentation, background blurring, blur effect, blur imparting and image processing by region).

Although the method for correcting the distance information in a case of calculating the distance information using a single kind of frequency band described in the present embodiment, the correcting method is not limited to the same. The effect of the present invention may be sufficiently demonstrated in a case in which the distance information is calculated using a plurality of frequency bands. In particular, defocus characteristics of the distance information in all the frequency bands used for the distance measurement are obtained in advance by the method described above and the correction data is generated for each frequency band. The distance information may be corrected accurately if correction is executed by using correction data of a corresponding frequency band. Since the distance information of each frequency band is converted into a defocus position by the correction data, distance information may be treated with a common index.

Figure 7:
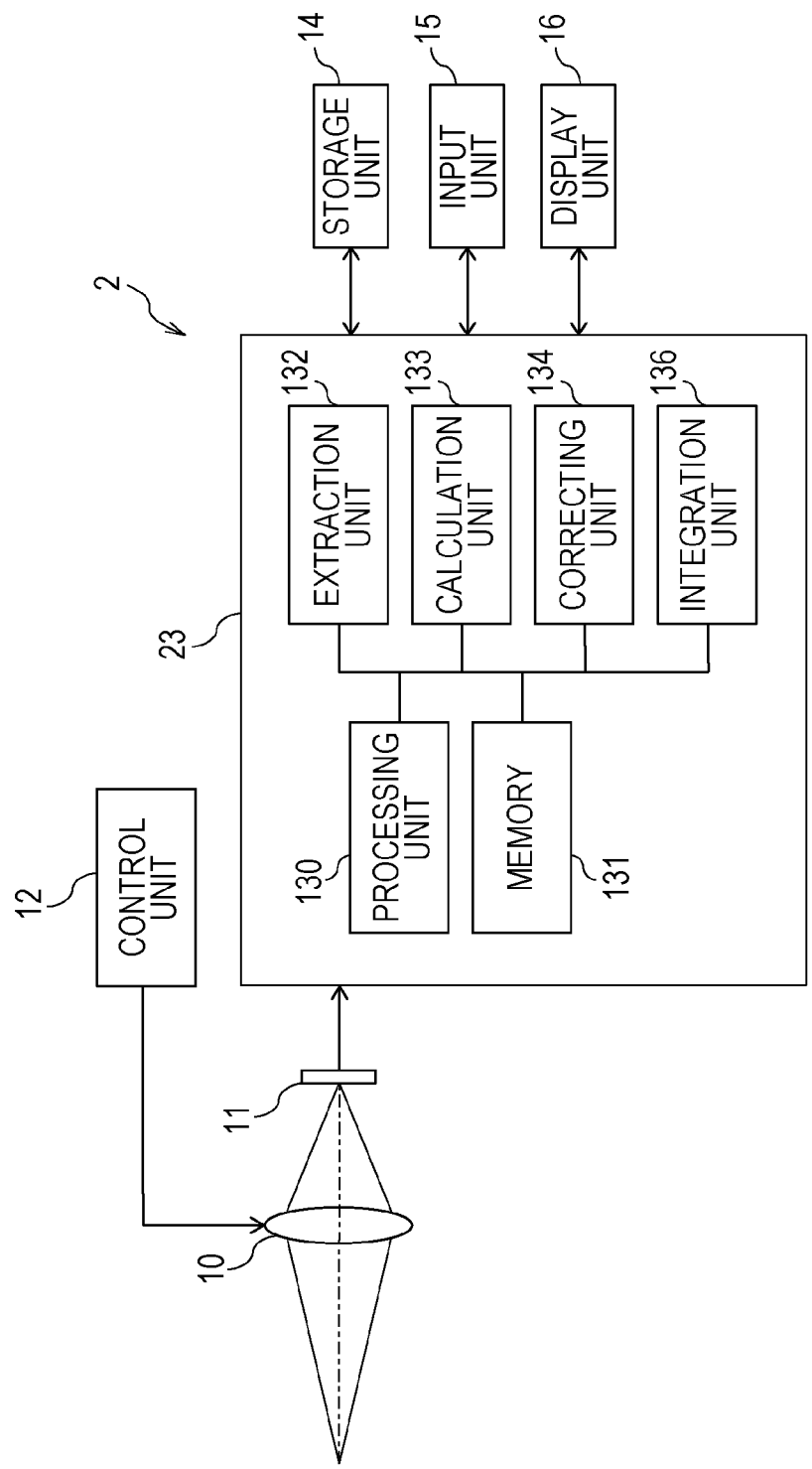
FIG. 7 is a schematic diagram of another exemplary image pickup device provided with an image processing device according to the second embodiment.

An image pickup device 2 used in a case of calculating distance information using a plurality of frequency bands has a configuration illustrated in FIG. 7. An image processing device 23 of the image pickup device 2 further includes an integration unit 136 which calculates a piece of distance information by integrating a plurality of pieces of distance information as compared with the image processing device 13. With this configuration, integrated distance information in which distance information of each frequency band is integrated may be calculated.

For the integration of this distance information, the fact that the defocusing range differs depending on the frequency is used. The distance information of a high frequency band has an advantage of high distance resolution and the distance information of a low frequency band has an advantage of a wide defocus range to be measured. Therefore, in particular, a high frequency band is used in a defocus range illustrated by an arrow of the solid line of FIG. 5A and a low frequency band is used in a defocus range illustrated by an arrow of the dashed line of FIG. 5B to calculate distance information in each frequency band. The calculated distance information in each frequency band is integrated into a piece of distance information. The integrated distance information consisting of distance information of each frequency band has an advantage of collecting the advantages. That is, it is desirable to measure distance with high distance resolution near the focus position using a high frequency component, to measure distance with mid-range distance resolution in the mid-range defocus range using a mid-range frequency component, and to measure distance with a low frequency component in the defocus range distant from the focus position. Therefore, the distance measuring range may be increased without lowering the distance measurement resolution.

Third Embodiment

The present embodiment will be described. The present embodiment differs from the second embodiment in that distance information corrected from the distance information in a plurality of types of wavelength ranges or colors is calculated. Hereinafter, differences from the second embodiment will be described mainly.

Figure 8:
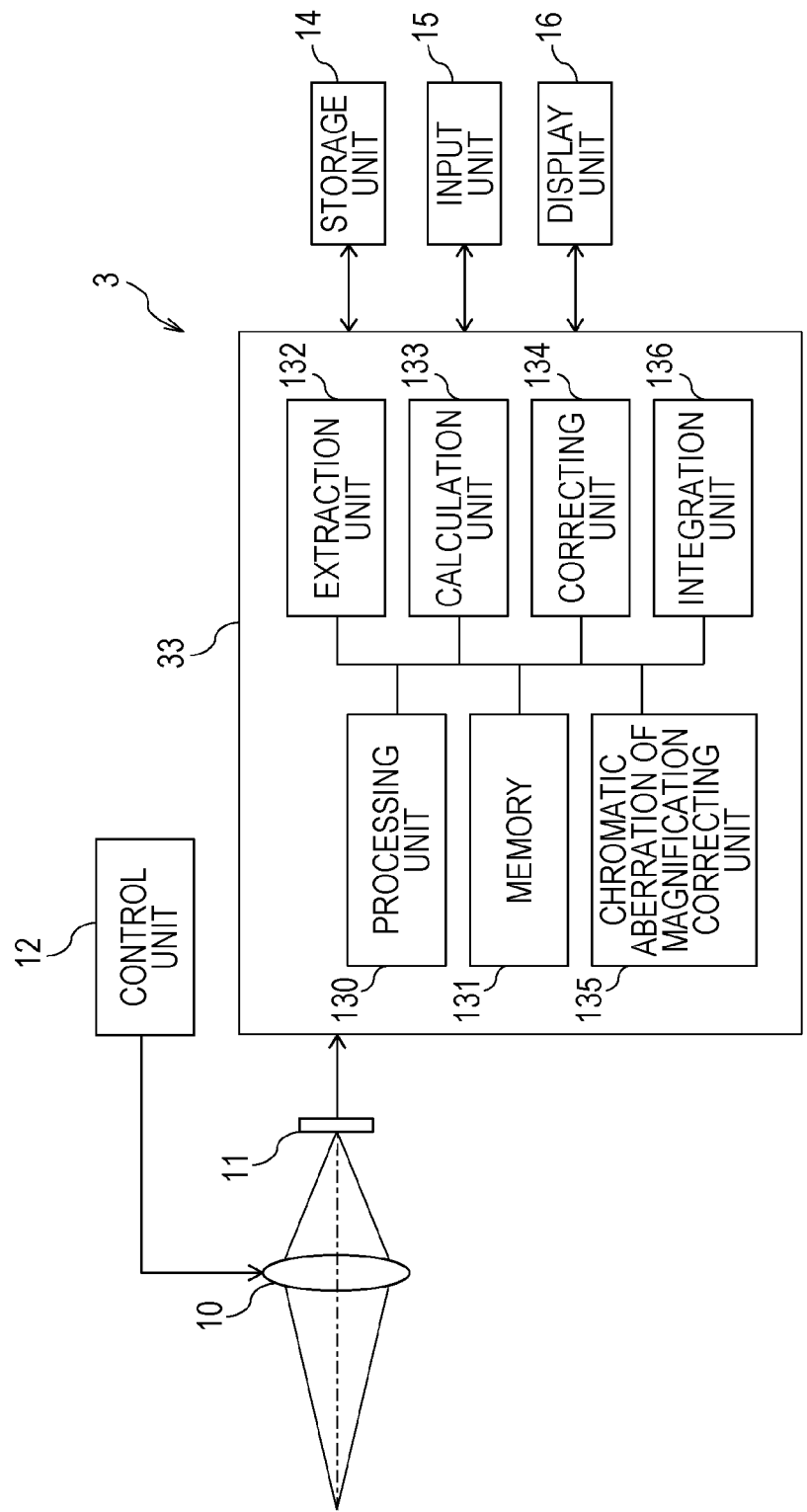
FIG. 8 is a schematic diagram of an exemplary image pickup device provided with an image processing device according to a third embodiment.

FIG. 8 schematically illustrates a configuration of an image pickup device 3 of the present embodiment. An image processing device 33 of the image pickup device 3 further includes a chromatic aberration of magnification correcting unit 135 and an integration unit 136 as compared with the image processing device 13.

An imaging optical system 10 photographs a focus image and a defocus image in the focus bracketing system. In a processing unit 130, analog signals output from an image pickup element 11 are converted into 3-color digital image signals of a red image, a green image and a blue image (hereafter, referred simply to as "image signals"). The red image is an image photographed mainly in a wavelength range of 580 nm to 720 nm. The green image is an image photographed mainly in a wavelength range of 440 nm to 620 nm. The blue image is an image photographed mainly in a wavelength range of 400 nm to 540 nm.

An extraction unit 132 has a function to extract a frequency component of a frequency band used for the distance measurement from an image signal of each color of the focus image and an image signal of each color of the defocus image. A calculation unit 133 has a function to calculate a distance of a subject from a difference in blur degree between a frequency component extracted from an image signal of each color of the focus image and a frequency component extracted from an image signal of each color of the defocus image. In the present embodiment, the calculation unit 133 calculates distance information in each of the three colors. Here, distance information of each of the three colors is calculated by comparing the images of the same color.

A correcting unit 134 has a function to correct the distance information of each color calculated in the calculation unit 133 using the correction data of each color generated in advance and stored in a storage unit 14. In the image pickup device of the present embodiment, correction data of the distance information corresponding not to one color but to each color is calculated by the method of the second embodiment illustrated in FIG. 6. In particular, a conversion table into a defocus position information is created from distance information which is created by extracting a frequency component of a frequency band used for the distance measurement from photographed images of the three colors obtained by photographing an evaluation chart in a manufacturing process of the image pickup device, and then calculating distance information. This conversion table is used as correction data. As described above, in the correcting unit 134, the distance information of each color calculated in the calculation unit 133 is converted into defocus position information. Therefore, conversion is made into distance information in a common index in all the color.

A chromatic aberration of magnification correcting unit 135 has a function to correct magnification deviation generated in the distance information of each color by chromatic aberration of magnification of the imaging optical system. An integration unit 136 has a function to calculate a piece of distance information by integrating distance information calculated from each image signal of three colors obtained in the correcting unit 134.

A difference in blur due to axial chromatic aberration and a curvature of field produced in a typical imaging optical system is too small to be perceived by a human being and thus does not cause a problem in respect of image quality of a photographed image. However, in a case in which distance information is calculated from a difference in blur as in the image pickup device of the present embodiment, detection accuracy of the distance information is improved by detecting a difference in blur that is too small to be perceived by a human being. For that reason, even small aberration (axial chromatic aberration or curvature of field) may cause an unfavorable distance measurement error in the distance information.

Figure 9:
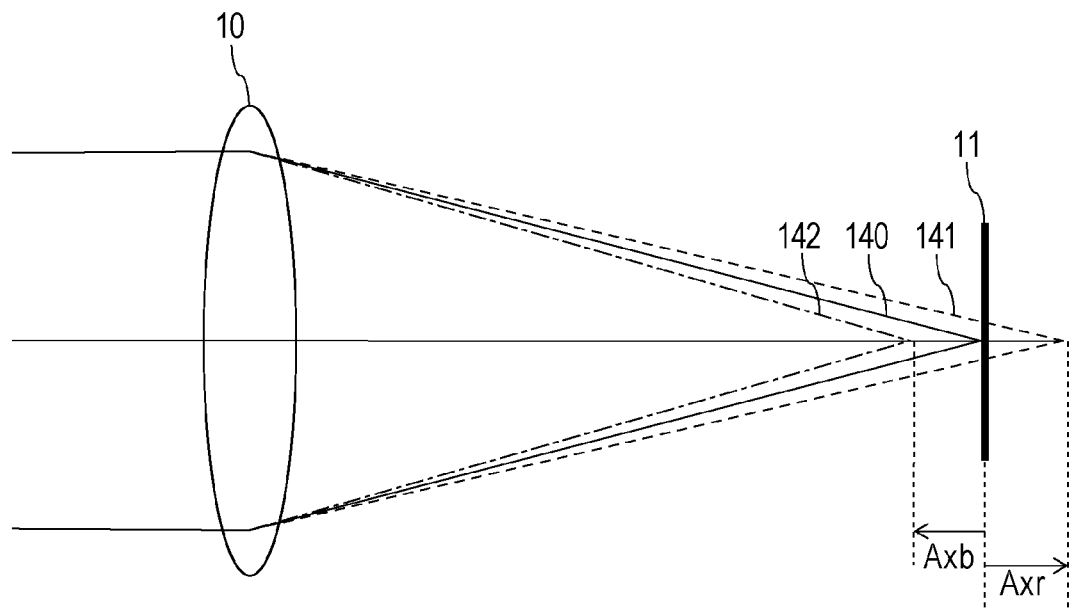
FIG. 9 is an optical path diagram describing axial chromatic aberration.

The axial chromatic aberration in a typical imaging optical system will be described with reference to FIG. 9. FIG. 9 illustrates a state in which the imaging optical system 10 condenses a light flux toward the image pickup element 11. An image of a light flux 140 of a green wavelength range is formed at a position of the image pickup element 11. An image of a light flux 141 of a red wavelength range is formed behind the image pickup element 11. An image of a light flux 142 of a blue wavelength range is formed in front of the image pickup element 11. Such aberration in which imaging positions are varied depending on the color (i.e., the wavelength range) is the axial chromatic aberration. Axr denotes axial chromatic aberration in the light flux in the red wavelength range and Axb denotes axial chromatic aberration in the light flux in the blue wavelength range. In the light flux in the green wavelength range, axial chromatic aberration is substantially 0. This is because green occupies 70% of the luminance signals and the imaging optical system tends to focus on the focus position of the green image. Since red tends to have weak refractive power and blue tends to have strong refractive power, axial chromatic aberration often occurs with red occurring behind and blue occurring in the front.

Figure 10:
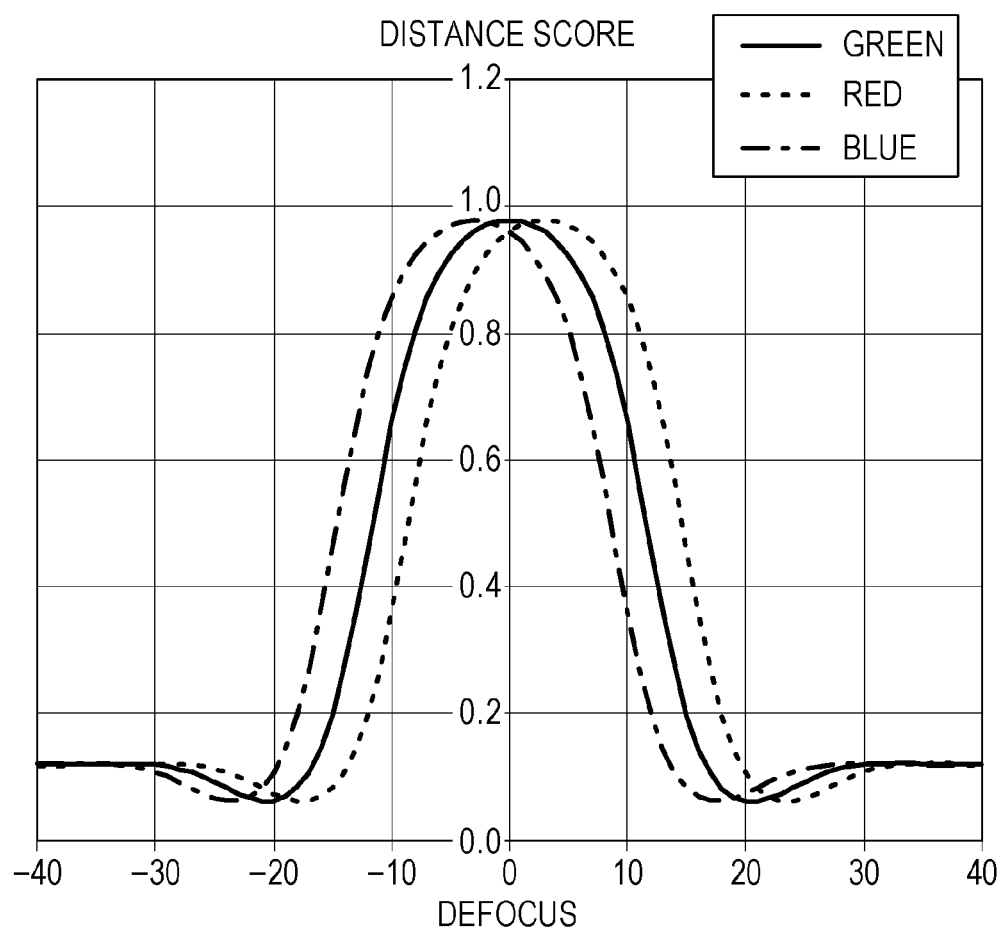
FIG. 10 is a diagram describing a relationship between axial chromatic aberration and defocus characteristics of distance information.

FIG. 10 illustrates defocus characteristics of the distance information in red, green and blue. An influence that the axial chromatic aberration of the imaging optical system has on the distance information of each color will be described with reference to FIG. 10. In the graph of FIG. 10, a solid line illustrates distance information in a green image, a dashed line illustrates distance information in a red image, and a dash-dot line illustrates distance information in a blue image. An original position of a defocus position of the distance information in the green image is a position of defocus 0. The original position of the defocus position of the distance information in the red image is shifted in the positive direction (i.e., behind the focus position) and the original position of the defocus position of the distance information in the blue image is shifted in the negative direction (i.e., in front of the focus position). These are influences by the axial chromatic aberration of the imaging optical system. As described above, since the original position of the defocus position of the distance information is shifted, a subject located at the same defocus position has different distance scores depending on its color.

Then, in the present embodiment, distance information is calculated in advance in a frequency band and a wavelength range used for the distance measurement, and an amount of measurement error in the distance information to be generated in the frequency band and the wavelength range is estimated as correction data. After that, distance information is obtained accurately by actually calculating distance information and subtracting correction data estimated in advance from the calculated distance information. In this manner, an image pickup device capable of measuring distance accurately without depending on the frequency band or the wavelength range used for the distance measurement may be provided.

The image pickup device of the present embodiment calculates a piece of distance information using simultaneously calculated distance information of three colors, whereby measurement accuracy of the distance information may be further improved. Also in a case in which there is a single color subject and it is difficult to measure distance information by other color, since the distance information of three colors may be obtained simultaneously in the image pickup device of the present embodiment, distance information may be obtained accurately without depending on the color of the subject.

Figure 11:
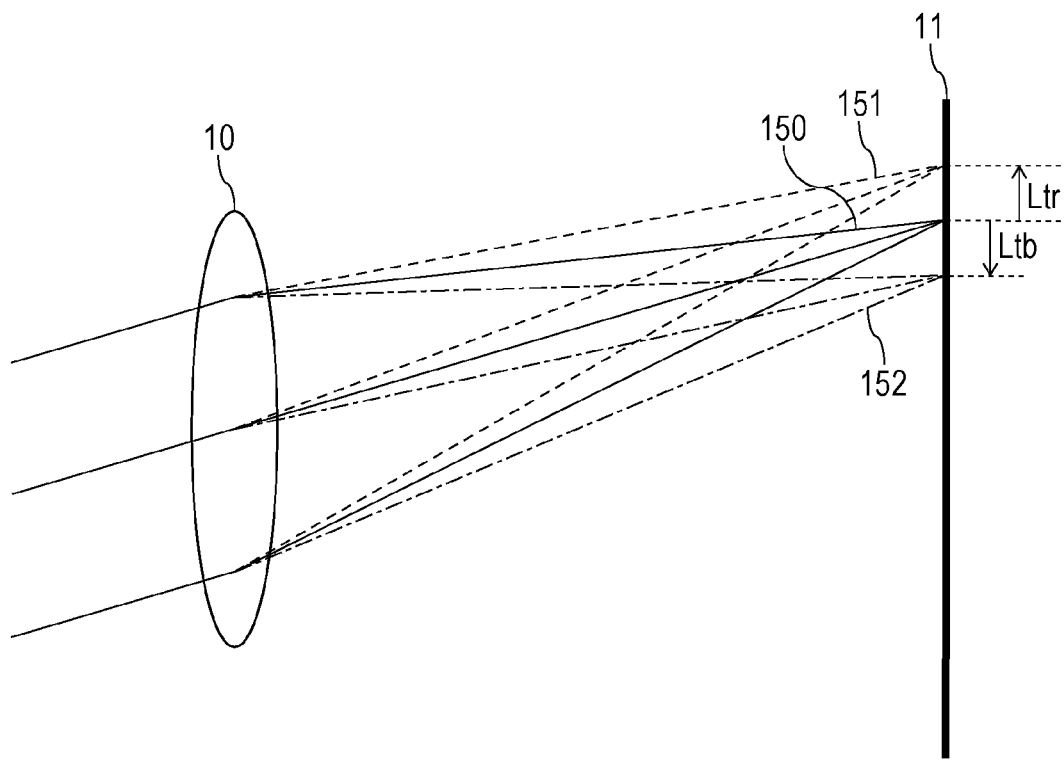
FIG. 11 is an optical path diagram describing chromatic aberration of magnification.

Next, chromatic aberration of magnification of a typical imaging optical system will be described with reference to FIG. 11. FIG. 11 illustrates a state in which the imaging optical system 10 condenses a light flux toward the image pickup element 11. An image of a light flux 150 of a green wavelength range is formed on the image pickup element 11. An image of a light flux 151 of a red wavelength range is formed on the image pickup element 11 in an image height outside the light flux 150 of the green wavelength range. An image of a light flux 152 of a blue wavelength range is formed on the image pickup element 11 in an image height inside the light flux 150 of the green wavelength range. In FIG. 11, Ltr denotes chromatic aberration of magnification in the light flux of the red wavelength range and Ltb denotes axial chromatic aberration in the light flux of the blue wavelength range. Also in this case, since red tends to have weak refractive power and blue tends to have strong refractive power, chromatic aberration of magnification occurs with a red image formed outside and a blue image formed inside a position at which a green image is formed.

In recent digital cameras, chromatic aberration of magnification correction of the imaging optical system is executed. In particular, chromatic aberration of magnification chromatic aberration of magnification is corrected by correcting magnification deviation of the red image or the blue image to the magnification of the green image. At this time, alignment of subpixel accuracy is executed in the red image and the blue image of which magnification deviation has been corrected. Since interpolation of pixels is executed in the alignment of subpixel accuracy, an image signal value of each pixel which the original image had is lost and, at the same time, it becomes difficult to detect a difference in blur accurately. When calculating a piece of distance information by integrating distance information of three colors, it is not possible to improve distance measurement accuracy of the integrated distance information in a state in which magnification of each color is deviated from each other due to chromatic aberration of magnification.

Then, in the image pickup device of the present embodiment, distance information is calculated to the image signal of each color, the distance information is corrected for each color, chromatic aberration of magnification correction is executed to make the magnification of each color equal and, after that, distance information that is the integrated distance information from each color is calculated. In this manner, distance information of each color may be calculated accurately and, at the same time, by this, distance measurement accuracy of distance information may be further improved when the distance information of the three colors is integrated.

Figure 12:
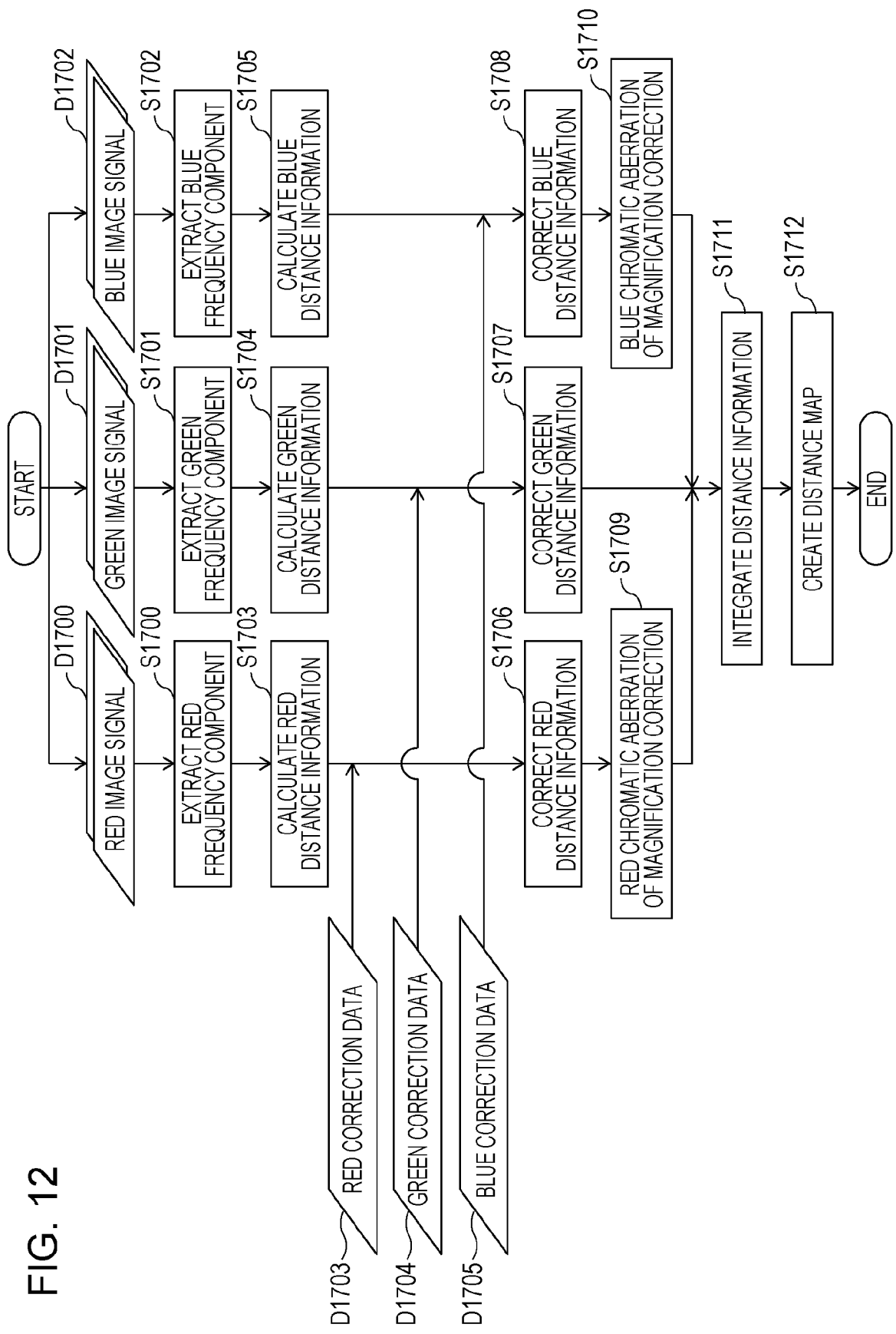
FIG. 12 is a flowchart of an exemplary image processing method according to the third embodiment.

FIG. 12 is a flowchart of the present embodiment. Operations to calculate integrated distance information and to create a distance map in the image pickup device 3 of the present embodiment will be described with reference to FIG. 12.

In an extraction process of a red frequency, the extraction unit 132 extracts a frequency component of a frequency band used for the distance measurement from two kinds of red image signals of the red image signal of the focus image and the red image signal of the defocus image (data D1700) (S1700). In the present embodiment, the frequency band used for the distance measurement is the frequency component corresponding to the period of 2.2 to 2.5 pixels which is the same as that of the second embodiment. In an extraction process of a green frequency, similarly, the extraction unit 132 extracts a frequency component of a frequency band used for the distance measurement from two kinds of green image signals of the green image signal of the focus image and the green image signal of the defocus image (data D1701) (S1701). In an extraction process of a blue frequency, similarly, the extraction unit 132 extracts a frequency component of a frequency band used for the distance measurement from two kinds of blue image signals (data D1702) (S1702).

In a calculating process of the red distance information, the calculation unit 133 calculates the red distance information of the subject by the DFD system from a difference in blur degree between the red frequency component of the extracted focus image and the red frequency component of the extracted defocus image (S1703). In a calculating process of the green distance information, similarly, the calculation unit 133 calculates green distance information of the subject from a difference in blur degree between the green frequency component of the extracted focus image and the green frequency component of the extracted defocus image (S1704). In a calculating process of the blue distance information, similarly, the calculation unit 133 calculates blue distance information of the subject from a difference in blur degree between the blue frequency component of the extracted focus image and the blue frequency component of the extracted defocus image (S1705).

In a correcting process of the red distance information, the correcting unit 134 corrects the red distance information calculated in S1703 based on the red correction data (data D1703) and calculates the red correction distance information (S1706). In particular, aberration, such as axial chromatic aberration and a curvature of field of color, is corrected, converted into defocus position information which is a common index of each color, and is used as red correction distance information. In a correcting process of the green distance information, the correcting unit 134 corrects the green distance information calculated in S1704 based on the green correction data (data D1704) and calculates the green correction distance information (S1707). In a correcting process of the blue distance information, the correcting unit 134 corrects the blue distance information calculated in S1705 based on the blue correction data (data D1705) and calculates the blue correction distance information (S1708).

Next, in a correcting process of red chromatic aberration of magnification, a chromatic aberration of magnification correcting unit 135 corrects chromatic aberration of magnification of the red correction distance information (S1709). In particular, magnification of the red image signal (data D1700) is made equal to magnification of the green image signal (data D1701). Then the chromatic aberration of magnification correcting unit 135 executes chromatic aberration of magnification correction of the red correction distance information using the same corrected value as that used in the chromatic aberration of magnification correction of the image signal that has been corrected so that image positions overlap. In this case, alignment may be executed with subpixel accuracy and the value of the original red correction distance information may be changed by interpolation. This is because, since the distance information is already calculated, there is little influence of the distance information on depth accuracy and, instead of that, an improvement in horizontal resolution by executing alignment with the subpixel accuracy leads to precise distance information. In a blue chromatic aberration of magnification correcting process, similarly, the chromatic aberration of magnification correcting unit 135 corrects chromatic aberration of magnification of the blue correction distance information (S1710) using the corrected value as that used in the chromatic aberration of magnification correction of the blue image signal.

Subsequently, in an integrating process of the distance information, an integration unit 136 integrates, into a piece of distance information, correction distance information of three colors of red, green and blue of which magnification has been made equal by chromatic aberration of magnification correction, and calculates integrated distance information (S1711). In the processes described above, correction is made in order to calculate distance information of each color accurately. Here, this process is made in order to calculate more accurate distance information by collecting accurately calculated distance information. Calculation of the integrated distance information may use the average value of the distance information of the three colors. Then, distance resolution improves about 1.7 times. Other calculating methods may include weighting and averaging depending on a signal value of each color of the subject. A color with a high signal value includes information for calculating a difference in blur degree: therefore, a result that is less easily affected by noise and is thus highly reliable is obtained.

Next, in a creating process of a distance map, integrated distance information of the thus calculated each pixel is collected and a distance map is created (S1712). This distance map is used in various types of image processing executed to a photographed image (e.g. distance measurement, distance map creation, subject segmentation, background blurring, blur effect, blur imparting and image processing by region).

As described above, the image pickup device 3 of the present embodiment calculates distance information from image signals of a plurality of wavelength ranges, and corrects causes of errors in distance information, such as axial chromatic aberration, chromatic aberration of magnification and a curvature of field in the distance information of each color. Then integrated distance information is calculated based on the distance information of each color. Therefore, distance information may be obtained accurately. Moreover, since dependency on the color information of the subject does not exist, stable distance information may be obtained.

Fourth Embodiment

The image processing method of the present invention described above is desirably applied, for example, to an image pickup device, such as a digital camera and a camcorder, an image processing device and a computer which execute image processing to image data obtained by the image pickup device. The technique of the present invention is applicable also to various types of electronic equipment incorporating such an image pickup device or an image processing device (including a mobile phone, a smartphone, a slate device and a personal computer). Although a configuration incorporating the function of the image processing device in the main body of the image pickup device is described in the above embodiment, the configuration of the function of the image processing device is not limited to the same. For example, the image processing device may be incorporated in a computer which includes an image pickup device and the computer may obtain an image photographed by the image pickup device and calculate distance in accordance with the obtained image. Alternatively, the image processing device may be incorporated in a computer which is accessible by a wired or wireless network and the computer may obtain a plurality of images via the network and calculate distance in accordance with the obtained images. The obtained distance information may be used for various types of image processing, such as image area dividing, generation of a stereoscopic image and a depth map, and emulation of a blur effect.

The present invention may be mounted on the devices described above both by software (i.e., a program) and by hardware. For example, various processes for achieving the object of the present invention may be implemented by storing a program in a memory of a computer (e.g., a microcomputer or a FPGA) incorporated, for example, in an image pickup device, and making the computer execute the program. It is also desirable to provide a dedicated processor, such as an ASIC, which implements all or a part of the processes of the present inventions by a logical circuit.

The present invention is implemented as a function of an image processing device (i.e., an image processing engine) mounted in an image pickup device, such as a digital camera, a digital camcorder and a monitoring camera. It is used for various image processing (distance measuring, distance map creation, subject segmentation, background blurring, blur effect application, etc.) to photographed image.

The present invention is capable of obtaining distance information accurately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-207017, filed Oct. 2, 2013 which is hereby incorporated by reference herein in its entirety.

What is claimed is:

1. A processing device which obtains distance information of a subject, comprising:
   a calculation unit configured to calculate the distance information of the subject from a difference in blur degree of a plurality of images photographed by an imaging optical system;
   a correcting unit configured to correct the distance information using correction data in accordance with an image height in the imaging optical system; and
   an extraction unit configured to extract at least one frequency component from each of the plurality of images, wherein
   the calculation unit calculates the distance information from a difference in blur degree in the plurality of images in the at least one frequency component; and
   the correcting unit corrects the distance information using correction data in accordance with an image height in the at least one frequency component.

2. The processing device according to claim 1, wherein:
   the extraction unit extracts a plurality of frequency components;
   the calculation unit calculates a plurality of pieces of the distance information from the difference in blur degree of the plurality of images in each frequency component; and
   the correcting unit corrects each of a plurality of pieces of the distance information using correction data in accordance with an image height in each frequency component.

3. The processing device according to claim 2, further comprising an integration unit configured to integrate a plurality of pieces of corrected distance information.

4. The processing device according to claim 3, wherein:
   the plurality of frequency components have relatively high frequency components and relatively low frequency components; and
   the integration unit integrates, into a piece of distance information, distance information located relatively closer to the focus position using distance information of the high frequency component and distance information relatively farther from the focus position using distance information of the low frequency component.

5. The processing device according to claim 1, wherein the calculation unit calculates the distance information in at least one color of red, green and blue.

6. The processing device according to claim 5, wherein the calculation unit further includes a chromatic aberration correcting unit configured to calculate the distance information in a plurality of colors of red, green and blue and correct chromatic aberration of magnification of distance information in each of the plurality of colors.

7. The processing device according to claim 6, further comprising an integration unit configured to integrate a plurality of pieces of distance information of which chromatic aberration of magnification has been corrected.

8. The processing device according to claim 7, wherein the integration unit calculates an average value of a plurality of pieces of distance information.

9. The processing device according to claim 1, wherein the correction data in accordance with the image height is data that makes an original position of a defocus position offset.

10. The processing device according to claim 1, wherein the correction data in accordance with the image height is data that corrects a gradient of a defocus position.

11. An image pickup device, comprising
    an imaging optical system and
    the processing device according to claim 1.

12. A processing method, comprising:
    a calculating process in which the distance information of the subject is calculated from a difference in blur degree of a plurality of images photographed by an imaging optical system;
    a correcting process in which the distance information is corrected using correction data in accordance with an image height in the imaging optical system; and
    an extraction process in which at least one frequency component is extracted from each of the plurality of images, wherein
    in the calculating process, the distance information is calculated from a difference in blur degree in the plurality of images in the at least one frequency component; and
    in the correcting process, the distance information is corrected using correction data in accordance with an image height in the at least one frequency component.

13. The processing method according to claim 12, wherein:
    in the extraction process, a plurality of frequency components are extracted;
    in the calculating process, a plurality of pieces of the distance information are calculated from a difference in blur degree of the plurality of images in each frequency component; and
    in the correcting process, each of a plurality of pieces of distance information is corrected using correction data in accordance with image height in each frequency component.

14. The processing method according to claim 13, further comprising an integrating process in which the plurality of pieces of corrected distance information are integrated.

15. The processing method according to claim 12, wherein, in the calculating process, the distance information in at least one color of red, green and blue is calculated.

16. The processing method according to claim 15, further comprising a chromatic aberration correcting process in which the distance information in a plurality of colors of red, green and blue is calculated and chromatic aberration of magnification of distance information in each of the plurality of colors is corrected.

17. The processing method according to claim 16, further comprising an integrating process in which a plurality of pieces of distance information of which chromatic aberration of magnification has been corrected is integrated.

* * * * *